United States Patent Office 3,697,290
Patented Oct. 10, 1972

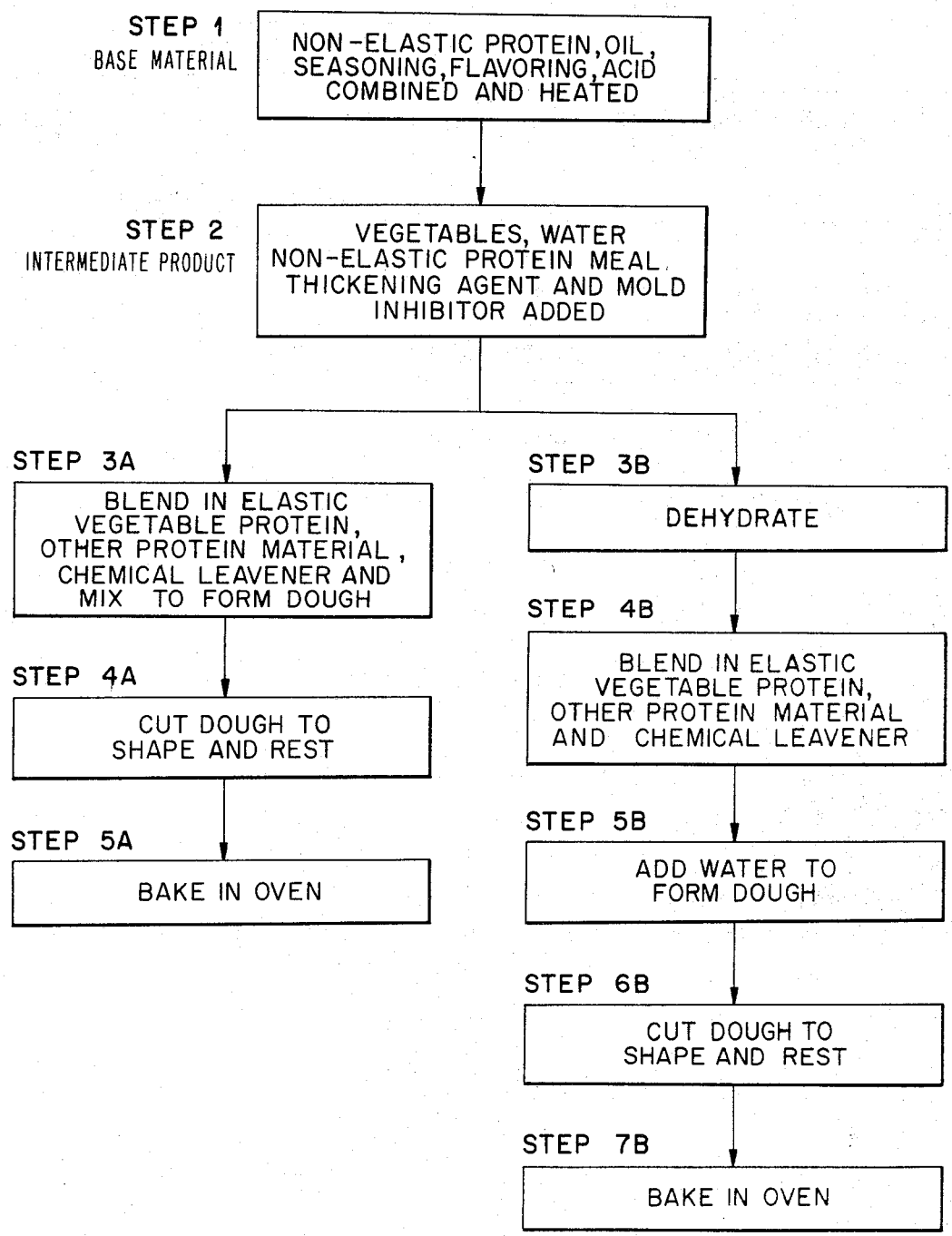

3,697,290
HIGH PROTEIN EDIBLE PRODUCTS AND
METHOD OF PREPARING SAME
Charles S. Lynn, 102—30 66th Road,
Forest Hills, N.Y. 11375
Continuation-in-part of application Ser. No. 846,428,
July 31, 1969. This application Nov. 25, 1969,
Ser. No. 879,717
Int. Cl. A21d 13/04, 13/06
U.S. Cl. 99—86
18 Claims

ABSTRACT OF THE DISCLOSURE

High protein edible products and the method of preparing same are described. A baked, leavened product includes a non-elastic protein such as sesame or a combination of sesame and soy bean, an elastic type vegetable protein such as wheat gluten or wheat gluten in combination with edible gums, and flavoring and texturing agents including vegetables. Crackers and cereal are made using a much lower amount or eliminating the elastic type vegetable protein.

CROSS REFERENCE TO RELATED APPLICATION

This application is a continuation-in-part of my copending application, Ser. No. 846,428, entitled, "High Protein Edible Product and Method of Preparing Same," filed July 31, 1969, and now abandoned.

BACKGROUND OF THE INVENTION

The present invention relates to high protein edible products of both the leavened and unleavened variety and to methods of producing same.

DESCRIPTION OF THE PRIOR ART

In one process commonly used in making a conventional loaf of bread, a sponge dough is prepared comprising flour, water, yeast, yeast food and sugar. Yeast is required for the fermentation or leavening. The sponge dough stands for three and a half to four hours during which leavening occurs. Thereafter, the balance of the ingredients is added to the dough; that is, more flour, more water, some milk solids and other necessary ingredients. A kneading procedure is followed. The water must be under a controlled temperature. After kneading, the dough rests for one-half to one hour. The dough is then placed in a divider which cuts the dough into desired weights. The divided dough is next passed into a molder. From the molder, the molded dough goes onto a pan which passes the molded dough into a temperature and humidity controlled proof box, during which time fermentation takes place. After approximately one hour in the proof box, the loaves of leavened dough pass into the oven where the baking takes place. The baking time varies with the type and size of the bread. The overall time in making the bread is approximately six to seven hours.

Conventional breads so prepared are generally quite low in protein, but quite high in carbohydrates. For example, ordinary white breads contain approximately 8½% to 9% protein, and rye breads generally no more than 9%. At the same time such breads have a carbohydrate level on the order of 48% to 52%.

Apart from the above-mentioned disadvantages, conventional breads have a very short shelf life, due to loss of moisture, loss of flavor and staling. Rye bread, for example, is noticeably drier after two to three days. With other breads, staling is noticeable in no more than one week.

More recently, the protein level of conventional breads has been increased by the addition of fortifiers such as more milk solids, extra gluten, soy bean flour, cotton seed flour; that is, oil seed grains from which the oil has been removed. What is being done here is that some of the starches are being replaced by the fortifiers, thereby reducing the carbohydrates and increasing the protein level. Such techniques have increased the protein level to approximately 11% to 12% without, however, any improvement in processing time or procedure, and with no increase in shelf life.

With most grains such as wheat and rye, of the basic constituents, the greatest proportion is carbohydrates or starches. A smaller proportion is protein, and a very small portion is fat. In contrast, in oil grain seeds, the greatest proportion is fat; a smaller proportion is protein and the least amount is the carbohydrate. Therefore, when the fat is removed from the oil grain seed, one is left with a non-elastic, high protein content material.

It has been suggested to add to conventionally baked breads, sesame, processed in some manner to remove its green taste, and added in small quantities to the conventional flour. Sesame seeds have also been used as a topping on baked products to add flavor.

SUMMARY OF THE INVENTION

An object of the invention is to use a non-elastic protein such as the oil seed grain as a major constituent in a high protein edible product of low carbohydrate content.

Another object is a high protein baked, leavened, edible product of low carbohydrate content.

Still another object is such a product requiring no yeast for leavening action.

A further object is such a product with an appreciably longer shelf life.

A still further object is the obtaining of products such as bread-like loaves by a process requiring much shorter processing time, only simplified equipment and relatively unskilled help.

The foregoing objects of the present invention are accomplished by starting with an non-elastic type protein material. Assuming that the ultimate product desired is a baked, leavened product, then this non-elastic type protein material is combined with an elastic type vegetable protein and various texture and flavoring agents including vegetables to produce a bread-like textured edible product. The taste, texture and structure of the product is created in a process in which the tendency of the elastic type vegetable protein, typically a wheat gluten, to expand or swell, is controlled or counteracted, within a body of non-elastic type protein material, typically sesame meal, alone or in combination with soy bean meal, corn meal, etc. The vegetables, which can be of the leaf, root or grain type, not only act as an extender or carrier for the other materials, but also add materially to the texture and flavor of the food product.

The process of manufacture provides a leavened loaf or baked edible product which can be made in about one and a half hours compared to the six to seven hours of the prior art; requires fewer steps in the process of manufacture with a resultant considerable saving in time, labor and expense; uses more simplified equipment in the process of manufacture, and, hence, less labor skill; provides a baked leavened edible product of high protein content of from 15% to 40%, but preferably between 20% and 30%, and a low carbohydrate content of from 15% to 40%, but preferably between 20% and 30% (on the total basis of the whole finished loaf), compared to conventional breads; has a long shelf life of two to three times the shelf life of conventional breads, and resembles in taste, appearance and overall character, a bread, and yet requires no yeast for the leavening and, therefore, no leavening time is required. Another advantage is that a minimum of cleaning of the equipment is required in the process of manufacture, for example, no or little dusting or greasing of the baking equipment is needed. Still another advantage is that no emulsifiers, artificial softeners, or conditioners to extend the shelf life of the bread (except for a mold inhibitor) are required in the making of the baked, leavened edible product of the invention, as compared to the making of conventional breads.

By means of the present invention, one is able to create a high protein and low carbohydrate loaf which has an exceptional overall food value. The loaf or roll of the invention provides the high nutritional value of a well balanced food with a perfectly enjoyable liporganic character at a moderate cost.

The preparation of the bread itself is simple and requires so little skill and equipment and a relatively wide range of ambient environment to produce that it becomes practical to manufacture the loaf or roll under many conditions and circumstances where normal bread production is extremely difficult and often impossible. In most instances the protein content of a leavened loaf made in accordance with the invention exceeds by approximately more than twice the protein content of average commercially available breads, and with very good amino acid and mineral values. In the manufacture of the bread of the invention, the indoor ambient temperature normally encountered in the temperate zones may vary over a wide range and have very little effect on the process and resulting product. Normal drinking water from the tap, having a temperature range anywhere from 40° to 90°F., preferably 60° to 80° F., may be used in the process of the manufacture without deleteriously affecting the end product.

Other edible product requiring yeast leavening, can be produced in accordance with this invention without yeast and with the numerous advantages pointed out above. Examples of such products are danish pastries and coffee cakes.

In accordance with another aspect of the present invention other non yeast-leavened items can be made. For example, a cracker or cereal can be made by reducing the amount of elastic protein material, only enough being included to create enough adherence or by completely eliminating same.

Additionally, the material of the present invention can be used as a protein fortifier for rye and wheat breads, cereal, noodles and the like.

BRIEF DESCRIPTION OF THE DRAWING

The foregoing and other objects, features and advantages of the invention will be apparent from the following, more particular description of the preferred embodiments of the invention as illustrated in the accompanying drawing, wherein the flow diagram illustrates the steps followed and materials used in the novel method and obtaining the novel product of the present invention.

DESCRIPTION OF THE PREFERRED EMBODIMENTS

Referring now to the drawing, the flowchart depicts in a broad manner the novel process of the present invention. In step 1, formation of the base material, a non-elastic type protein, oil, seasoning, flavoring and acid are combined and heated.

The non-elastic type protein can be hulled, chopped, or comminuted sesame seeds preferably in the range of 25% to 50% by weight. In one example extracted sesame meal was used in combination with sesame seeds. As noted above, the non-elastic material serves as a high-protein source. Other non-elastic type proteins that can be used are soy bean, cotton seed, etc.

A variety of oils, preferably in the range of 35% to 50% can be used, for example, vegetable oil made from sesame, cotton seed oil (preferred) and soy bean oil. The preferred bland vegetable oils have virtually no odor or taste. Other oils such as soy bean oil should be avoided unless deodorized. A quantity of salt, preferably in the range of 12% to 25%, is included for seasoning.

The foregoing three elements are heated together with occasional stirring at a low simmering temperature, approximately 300° to 350° F. for a short period of time.

Then, flavoring agents (finely ground caraway seeds when making a rye-like bread) and a mild acid such as citric acid are added to the foregoing and the heating continued for a short period of time to bring out the flavor. Other acids that can be used are tartaric and adipic. However, if a mild acid other than citric acid is used, the pH will vary so that weight percentage amounts will change slightly.

The caraway are included mainly for their rye-type flavoring characteristics although they are beneficial to the texture. Oil of caraway may be used instead of the caraway seeds. Similarly, oleo resin caraway (an oily liquid substance) may be used having the flavor character of caraway seeds. If either of the foregoing substitutes are used for the caraway seeds themselves, then a proper adjustment of the substitutes must be made to achieve desired flavoring. The resulting material from the foregoing steps is dark, brown, oily and sandy in appearance. The caraway need not be included in this step but could be added in the following step 2.

In step 2, formation of the intermediate product, vegetables, water, non-elastic protein meal, a thickening agent and a mold inhibitor are added to the base material formed in step 1. Optionally, the mold inhibitor can be introduced at step 3.

Initially, the vegetables are added to the base material along with water and boiled for a period of time depending on the vegetables used. A wide variety of vegetables of the leaf, root or grain type can be used. Vegetables are included for their flavoring characteristics and of course the taste characteristic will vary somewhat with the vegetables used. Examples of vegetables that can be used are potatoes, corn, sugar beets, parsnips, turnips, carrots, parsley, parsley roots, cabbage, etc. Spinach and parsley will produce an odd color in the finished product. Normally the vegetables are used in their raw state. However, many can also be used in dry form such as corn meal for corn, potato flour for potatoes, etc.

After the boiling of the foregoing combination, additional water and non-elastic protein meal are added and the entire mass is brought back to the boiling temperature for another short period depending on the materials used. Examples of non-elastic protein meals are extracted sesame meal, cotton seed meal and soy bean meal.

The non-elastic protein meal is preferably fat free. The defatting of the non-elastic protein meal is done by a solvent extraction process, or by an expeller extraction process using heat low enough so as not to denature the protein, or by a combination of solvent extracted and expeller extracted material.

At this point a thickening agent, preferably farina made from wheat or corn is added and cooking continues. The thickening agent is required to create a desirable texture. Other thickening agents can be used such as wheat or corn starch or wheat flour.

To inhibit the propagation of mold, a suitable, acceptable amount of inhibitor conforming with the Food and Drug Administration Regulations can be added, for example, sorbic acid or potassium sorbate or a very small percentage of propyl paraben.

This completes the cooking stage and the resulting material is a mash which is brown-greyish in color. At this point a person has the option of either dehydrating the wet material and storing, or continuing with the wet material.

Pursuing with the wet material and with reference to step 3A in the drawing, there is added to the material an elastic vegetable protein, other protein materials and a chemical leavener. The material is blened, mixed and kneaded into a dough. Optionally, other materials can be added at this point to modify flavor and texture characteristics. Representative of these materials would be wheat flour, albumen, cheese, etc.

A typical elastic vegetable protein is wheat gluten. Wheat gluten can be obtained from wheat by different processes. After it is washed out it can be spray dried or it can be dried by other means. Spray dried gluten is generally much lighter by weight and therefore more readily lends itself to formation of the desired cellular structure. However, the taste and general palatability in the final product is not as good as glutens prepared by other methods.

A portion of gluten can be replaced with edible vegetable gums such as carboxymethyl cellulose gum, seaweed gums, gum tragacanth, etc. Very good results have been achieved by replacing a certain proportion of gluten with a cellulose gum. Corn gluten has virtually no resiliency and therefore not desirable.

Also added to the material are certain additional sources of protein, for example, whole eggs, a mixture of casein, lecthin, albumen and water and commercially available milk solids. A chemical leavener such as baking powder, bicarbonate of soda or a combination of both is blended in.

After thoroughly blending, the resulting mixture constitutes a dough which may be removed from the mixing bowl and cut into desired sizes (step 4A) and molded in the usual fashion into the desired shape of bread-like loaf or rolls, etc. where it is rested for preferably, but not necessarily, 10 to 20 minutes and then baked (step 5A) in an oven to form a baked, leavened bread-like product.

It should be observed that the wet base material already contains most of the water necessary to form the dough. Hence, if desired, the egg solids, non-fat milk solids, wheat gluten and chemical leavener can be combined in the dry form before adding to the wet base material. In this case a slight adjustment of the water content should be made to balance the moisture normally present in whole eggs.

Merely adding the contents of the two combinations together both wet and dry, and thoroughly blending will produce the dough. It will, therefore, be understood that the wet base material can be sold in a frozen state in a package while the dry ingredients can be sold in another package and both thoroughly mixed to form the dough which is subsequently molded into the shape of a loaf of bread or a roll.

Permitting the molded loaf to rest at normal room temperature causes the material therein to relax, thereby helping to create the desired shape or a more controlled shape of the loaf or roll when subsequently baked. Less desirable shape properties result when the dough is placed in an oven without rest.

The cut and shaped material is then placed into any conventional oven at a temperature of approximately 400° to 450° F. It requires a baking time very much like a regular bread or cracker as the case may be.

During this baking time, the dough rises and leavening occurs, as a result of which the loaf or roll or pastry has the appearance and taste of a conventional loaf of bread or pastry with the usual cellular structure.

A further advantage is that the dough of the invention does not stick to most materials, particularly to metals. The pan or oven hearth, therefore, need be treated with very little or no flour or grease and the loaf will virtually leave no mark on the processing equipment at the baking stage.

In the dry process, the brown-greyish material resulting from step 2 is dehydrated to obtain a dry base material at step 3B. This dry base material may then be stored. Subsequently, the dry base material can be blended with an elastic vegetable protein, other protein materials and a chemical leavener (step 4B), water added to form a dough (step 5B) and processed (steps 6B and 7B) to form bread, rolls or pastry as explained above.

A cracker product, with some slight variations in steps 1, 2 and 3A or 4B can be produced. In step 3A or 4B the amount of elastic type protein is reduced. Also, snack items or cereal can be produced with very slight changes in the process steps. In step 3A or 4B, for example, most or all of the elastic type protein material is eliminated and replaced with a higher proportion of edible gums, starches or combinations of both. Also the chemical leaveners are reduced or eliminated.

The following examples are included merely to aid in the understanding of the invention, and variations may be made by one skilled in the art without departing from the spirit of the invention.

EXAMPLE 1

Base material:
| Ingredient | Amount[1] | Instructions |
|---|---|---|
| Chopped sesame seeds | 34 | Combined and simmered at 300°–350° F. for 90 minutes. |
| Vegetable oil | 43 | |
| Salt (NaCl) | 17 | |
| Citric acid | 1 | |
| Caraway seeds | 5 | Heating continues for 30 minutes. |

Intermediate product:
| Ingredient | Amount[1] | Instructions |
|---|---|---|
| Parsnips | 120 | Combined and boiled for 20–25 minutes at 215°–230° F. |
| Carrots | 30 | |
| Water | 450 | |
| Base material | 100 | |
| Water | 450 | Cooking continues for 20–25 minutes. |
| Ground sesame meal | 150 | |
| Farina | 60 | Cooking continues for 5–15 minutes. |

Final mix:
| Ingredient | Amount[1] | Instructions |
|---|---|---|
| Intermediate product | 1,000 | Blended. |
| Whole eggs | 100–200 | |
| Mold inhibitor | 2 | |
| Milk solids | 105 | Blended to form dough, then rest for 15–20 minutes. |
| Wheat gluten | 310 | |
| Baking powder | 15 | |

[1] Grams.

The cut and shaped loaf is placed in a conventional oven at 400°–450° F. and baked. The dough rises, leavening occurs and the resulting loaf has the appearance and taste of a conventional rye bread with the usual cell-like openings in the loaf. The finished product has a protein content above 25% and a carbohydrate level of no more than 25%.

EXAMPLE 2

Base material:
| Ingredient | Amount[1] | Instructions |
|---|---|---|
| Ground sesame | 100 | Heat and slow simmer 1½ hours. |
| Cottonseed oil | 125 | |
| Salt | 47 | |
| Citric acid | 3 | |
| Ground caraway | 15 | Add and continue heating ½ hour. |

Intermediate product:
| Ingredient | Amount[1] | Instructions |
|---|---|---|
| Parsnips | 50 | Boil 25 minutes. |
| Cabbage | 50 | |
| Water | 450 | |
| Base material | 60 | Add and boil 15 minutes more. |
| Ground sesame | 20 | |
| Extracted sesame meal | 80 | |
| Water | 200 | |
| Farina | 40 | Add and cook 5 more minutes. |

Final mix:
| Ingredient | Amount[1] | Instructions |
|---|---|---|
| Nonfat milk solids | 4 | Blend together. |
| Baking powder | 2 | |
| Wheat gluten | 20 | |
| All purpose flour | 9 | |
| Intermediate product | 100 | Add and knead to a dough. |

[1] Grams.

The resulting baked product has a protein content of approximately 24% and a carbohydrate level of 24%.

EXAMPLE 3

| Base material: | | |
|---|---|---|
| Ground sesame | [1] 100 | Heat and slow simmer for 75 minutes. |
| Cottonseed oil | [1] 125 | |
| Salt | [1] 47 | |
| Citric acid | [1] 3 | |
| Ground caraway | [1] 15 | Add and continue heat ½ hour. |
| Intermediate product: | | |
| Parsnips | [1] 30 | Boil 25 minutes. |
| Carrots | [1] 10 | |
| Base material | [1] 15 | |
| Water | [1] 400 | |
| Water | [1] 200 | Add and boil 15 minutes more. |
| Extracted sesame | [1] 60 | |
| Farina | [1] 20 | Add and cook 5 more minutes. |
| Remove from heat; blend in 25 gram whole eggs, 0.5 gram potassium sorbate. | | |
| Final mix: | | |
| Wheat gluten | [1] 20 | Blend together. |
| Milk solids | [1] 7 | |
| Bicarbonate of soda | [1] 0.5 | |
| All purpose flour | [1] 117.5 | |
| Intermediate product | [1] 100 | Add to above and knead to a dough. |

[1] Grams.

The resulting product placed in an oven and baked as above contains approximately 23% protein and 28% carbohydrates.

EXAMPLE 4

| Base material: | | |
|---|---|---|
| Ground sesame | [1] 100 | Heat and slow simmer 75 minutes. |
| Oil | [1] 125 | |
| Salt | [1] 47 | |
| Citric acid | [1] 3 | |
| Ground caraway | [1] 15 | Add and continue heating ½ hour. |
| Intermediate product: | | |
| Parsley roots | [1] 120 | Boil 20 minutes. |
| Carrots | [1] 30 | |
| Base material | [1] 100 | |
| Water | [1] 450 | |
| Do | [1] 450 | Add and boil 20 minutes. |
| Extracted sesame meal | [1] 150 | |
| Farina | [1] 60 | Add and cook 5 minutes. |
| Whole eggs | [1] 200 | Remove from heat above, then add and blend in. |
| Sorbic acid | [1] 1.5 | |
| Final mix: | | |
| Nonfat milk solids | [1] 15.75 | Blend together. |
| Baking powder | [1] 2.25 | |
| Wheat gluten | [1] 47.00 | |
| Intermediate product | [1] 180 | Add and knead to a dough. |

[1] Grams.

The resulting baked product has a protein content of 29% and 23% carbohydrates.

EXAMPLE 5

| Base material: | | |
|---|---|---|
| Ground sesame | [1] 200 | Heat and simmer 20 minutes. |
| Cottonseed oil | [1] 200 | |
| Salt | [1] 100 | |
| Citric acid | [1] 10 | |
| Ground caraway | [1] 40 | Add and simmer 20 minutes. |
| Extracted sesame meal | [1] 100 | |
| Intermediate product: | | |
| Parsnips | [1] 110 | Boil 20 minutes. |
| Corn | [1] 110 | |
| Cabbage | [1] 110 | |
| Base material | [1] 240 | |
| Water | [1] 600 | |
| Do | [1] 900 | Add and bring back to boil. |
| Extracted sesame meal | [1] 280 | Add and boil 20 minutes. |
| Farina | [1] 146 | Add and cook 5 minutes. |
| Sorbic acid | [1] 4 | |
| Final mix: | | |
| Nonfat milk solids | [1] 30 | Blend together. |
| Baking powder | [1] 4 | |
| Bicarbonate of soda | [1] 2 | |
| All purpose flour | [1] 43 | |
| Wheat gluten | [1] 72 | |
| Dehydrated intermediate | [1] 85 | |
| Water | [1] 180 | Add and knead. |

[1] The dough, when baked, results in a final product comprising 27% protein and 24% carbohydrates.

The dough, when baked, results in a final product comprising 27% protein and 24% carbohydrates.

EXAMPLE 6

| Base material: | | |
|---|---|---|
| Ground sesame | [1] 150 | Simmer 15 minutes. |
| Cottonseed oil | [1] 138 | |
| Salt | [1] 88 | |
| Citric acid | [1] 7.5 | |
| Ground caraway | [1] 42.5 | Add and simmer 30 minutes. |
| Defatted sesame meal | [1] 75.0 | |
| Intermediate product: | | |
| Potatoes | [1] 100 | Boil 10 minutes. |
| Base material | [1] 165 | |
| Water | [1] 400 | |
| Do | [1] 750 | Add and bring back to boil. |
| Extracted sesame meal | [1] 125 | Add and boil 25 minutes. |
| White corn meal | [1] 50 | |
| Soya flour | [1] 75 | |
| Farina | [1] 62.5 | Add and cook 5 minutes. |
| Sorbic acid | [1] 2.5 | |
| Final mix: | | |
| Nonfat milk solids | [1] 30 | Blend together. |
| Bicarbonate of soda | [1] 2 | |
| Baking powder | [1] 6 | |
| High gluten flour | [1] 72 | |
| Wheat gluten | [1] 55 | |
| Intermediate product | [1] 230 | Add and blend. |
| Propylene glycol | [1] 8 | Add and knead. |
| Cellulose gum | [1] 2 | |

[1] Grams.

The resulting baked product is approximately 23% protein and 30% carbohydrates.

The end products achieved from the various steps are interchangeable. For example, base material from Example 1 can be used in intermediate product of Example 3, and intermediate product 3 can be used in the final mixing step of Example 5.

While the invention has been particularly shown and described with reference to the preferred embodiments thereof, it will be understood by those skilled in the art that various changes and omissions can be made therein without departing from the spirit and scope of the invention.

What is claimed is:

1. In the process of preparing a high protein edible product the steps comprising:
   a combining non-elastic protein material, oil and salt and heating at a low simmering temperature;
   adding a mild acid to the foregoing and continuing heating for a period of time sufficient to bring out flavor characteristics;
   adding water and vegetables and boiling;
   adding additional water and non-elastic protein material and continuing boiling; and,
   adding a thickening agent and continuing boiling to obtain an intermediate food product of high protein content with desired texture, flavor and blending characteristics.

2. The process according to claim 1 wherein said non-elastic protein material is an oil seed grain.

3. The process according to claim 1 wherein said non-elastic protein material includes sesame.

4. The process according to claim 1 wherein said non-elastic protein material includes sesame and soybean.

5. The process according to claim 1 wherein said vegetables include potatoes.

6. The process according to claim 1 wherein said thickening agent is farina.

7. The product produced in accordance with the process of claim 1.

8. The process according to claim 1 including combining said intermediate product with an elastic type vegetable protein and leavener to form a dough, molding said dough into a desired shape, and baking to form a baked, leavened, break-like product.

9. The process according to claim 8 wherein said elastic type vegetable protein includes gluten.

10. The process according to claim 8 wherein said elastic type vegetable protein includes gluten and an edible vegetable gum.

11. The process according to claim 8 including adding further protein sources including milk solids prior to baking.

12. The process according to claim 8 including resting said dough prior to baking.

13. The process according to claim 8 including dehydrating said intermediate-product to form a dry base material and then combining with an elastic type vegetable protein, and water to form said dough.

14. The product produced in accordance with the process of claim 8.

15. The process according to claim 1 including combining said intermediate product with an elastic type vegetable protein to form a dough and baking to form a baked product.

16. The product produced in accordance with the process in claim 15.

17. The process according to claim 1 including combining said intermediate product with edible gums, starches or combinations of said gums and starches and baking.

18. The product produced in accordance with the process in claim 17.

References Cited

UNITED STATES PATENTS

| | | | |
|---|---|---|---|
| 3,185,574 | 5/1965 | Gabby et al. | 99—86 |
| 3,076,710 | 2/1963 | Koolhaus | 99—90 HP |

RAYMOND N. JONES, Primary Examiner

J. R. HOFFMAN, Assistant Examiner

U.S. Cl. X.R.

99—17, 99 HP, 90 S, 90 NS